(12) United States Patent
Schulz et al.

(10) Patent No.: US 11,218,692 B2
(45) Date of Patent: Jan. 4, 2022

(54) TESTING AND/OR CALIBRATING OF A CAMERA, IN PARTICULAR A DIGITAL CAMERA, BY MEANS OF AN OPTICAL TEST STANDARD

(71) Applicant: WIPOTEC GMBH, Kaiserslautern (DE)

(72) Inventors: Stefan Schulz, Kaiserslautern (DE); Rene Elspass, Winnweiler (DE)

(73) Assignee: WIPOTEC GMBH, Kaiserslautern (DE)

( * ) Notice: Subject to any disclaimer, the term of this patent is extended or adjusted under 35 U.S.C. 154(b) by 0 days.

(21) Appl. No.: 16/472,681

(22) PCT Filed: Dec. 20, 2017

(86) PCT No.: PCT/DE2017/101089
§ 371 (c)(1),
(2) Date: Jun. 21, 2019

(87) PCT Pub. No.: WO2018/113846
PCT Pub. Date: Jun. 28, 2018

(65) Prior Publication Data
US 2019/0373251 A1 Dec. 5, 2019

(30) Foreign Application Priority Data
Dec. 23, 2016 (DE) .......................... 102016125642.0

(51) Int. Cl.
*H04N 17/00* (2006.01)
*G06T 7/80* (2017.01)
*G06T 7/00* (2017.01)
(Continued)

(52) U.S. Cl.
CPC ....... *H04N 17/002* (2013.01); *G06K 7/10722* (2013.01); *G06K 7/1413* (2013.01);
(Continued)

(58) Field of Classification Search
CPC ........... H04N 17/002; G06T 7/80; G06T 7/97; G06T 7/0002; G06T 2207/10144;
(Continued)

(56) References Cited

U.S. PATENT DOCUMENTS 5,600,574 A 2/1997 Reitan
6,654,493 B1 * 11/2003 Hilliard .................... G09G 5/00
348/E17.002
(Continued)

FOREIGN PATENT DOCUMENTS

CN 105389808 A 3/2016
DE 202004021915 U1 11/2012
(Continued)

OTHER PUBLICATIONS

GS1 2D Barcode Verification Process Implementation Guideline Jul. 2015 (Year: 2015).*
"International Search Report" dated Mar. 22, 2018, issued in corresponding PCT Application No. PCT/DE2017/101089, Filed Dec. 12, 2017.

*Primary Examiner* — Michael E Teitelbaum
(74) *Attorney, Agent, or Firm* — Perry + Currier, Inc.

(57) ABSTRACT

A method for testing and/or calibrating a camera is provided. An optical test standard is produced. A plurality of subareas, with different grey tones, are applied to a substrate. At least one reference image of the substrate is captured using a reference camera, using a predetermined setting comprising at least one parameter. Reference greyscale values for the subareas are determined from the reference image and assigned to the substrate. At least one image of the optical test standard is captured by the camera using a predetermined setting of the camera, the setting comprising at least one parameter. Actual greyscale values for the subareas are determined from this image. An assertion about a sufficient or insufficient calibration of the camera is made based on a (Continued)

comparison of the actual greyscale values with the reference greyscale values or with a predetermined range of permissible actual greyscale values.

12 Claims, 5 Drawing Sheets

(51) Int. Cl.
    *G06K 7/10*     (2006.01)
    *G06K 7/14*     (2006.01)
    *G06K 19/06*     (2006.01)

(52) U.S. Cl.
    CPC ..... *G06K 7/1417* (2013.01); *G06K 19/06028* (2013.01); *G06K 19/06037* (2013.01); *G06T 7/0002* (2013.01); *G06T 7/80* (2017.01); *G06T 7/97* (2017.01); *G06T 2207/10144* (2013.01); *G06T 2207/30168* (2013.01)

(58) Field of Classification Search
    CPC ........ G06T 2207/30168; G06K 7/1413; G06K 7/1417; G06K 19/06028; G06K 19/06037
    See application file for complete search history.

(56) References Cited

U.S. PATENT DOCUMENTS

| | | | |
|---|---|---|---|
| 2004/0211838 A1* | 10/2004 | O'Callaghan | G07B 17/00661 235/470 |
| 2009/0046171 A1* | 2/2009 | Kogan | H04N 1/62 348/223.1 |
| 2011/0143811 A1 | 6/2011 | Rodriguez | |
| 2011/0292219 A1* | 12/2011 | Chang | G06T 7/80 348/182 |
| 2013/0162840 A1* | 6/2013 | Bengtsson | G01J 3/52 348/188 |
| 2014/0125818 A1* | 5/2014 | Friend | H04N 17/002 348/184 |

FOREIGN PATENT DOCUMENTS

| | | |
|---|---|---|
| JP | 2003116059 A | 4/2003 |
| JP | 2004088247 A | 3/2004 |
| JP | 2005176209 A | 6/2005 |
| WO | 2016049259 A1 | 3/2016 |

* cited by examiner

| Reference | Field | Area | Mean | Min | Max |
|---|---|---|---|---|---|
| | LO | 90.000 | 12,196 | 8 | 26 |
| | LU | 90.000 | 39,553 | 27 | 64 |
| | RO | 90.000 | 81,191 | 65 | 104 |
| | RU | 90.000 | 211,549 | 191 | 228 |
| | | | | | |
| Field camera | Field | Area | Mean | Min | Max |
| | LO | 90.000 | 9,812 | 6 | 20 |
| | LU | 90.000 | 31,397 | 23 | 49 |
| | RO | 90.000 | 64,918 | 51 | 81 |
| | RU | 90.000 | 169,572 | 153 | 183 |

Table 1

TESTING AND/OR CALIBRATING OF A CAMERA, IN PARTICULAR A DIGITAL CAMERA, BY MEANS OF AN OPTICAL TEST STANDARD

CROSS-REFERENCE TO RELATED APPLICATIONS

The present specification claims priority from PCT Application No. PCT/DE2017/101089, filed Dec. 20, 2017, which in turn claims priority from German Patent Application No. 102016125642.0, filed Dec. 23, 2016, the contents of each is herein incorporated by reference.

FIELD

The invention relates to a method for testing and/or calibrating a camera, in particular a digital camera, using an optical test standard. In addition, the invention relates to an optical inspection apparatus having a camera, wherein the inspection apparatus is configured in such a manner that the method according to the invention for testing and/or adjusting the camera can be carried out automatically or with the intervention of an operator. Finally, the invention relates to a method for producing a suitable optical test standard.

BACKGROUND

Cameras are used for inspection of products and their packaging in the manufacturing industry, in picking, and in retail. For example, optical labels that may be applied to a package—for example, by printing, or adhered in the form of a separate substrate—may be read and/or checked using cameras. The information applied to the labels may be in plain text or in the form of graphic codes—for example, in the form of one-dimensional optical codes (for example, barcodes) or two-dimensional optical codes (for example, matrix codes).

BRIEF DESCRIPTION OF THE DRAWINGS

The invention will be explained in more detail below with reference to an embodiment shown in the drawings, wherein.

DETAILED DESCRIPTION

Cameras are used for inspection of products and their packaging in the manufacturing industry, in picking, and in retail. For example, optical labels that may be applied to a package—for example, by printing, or adhered in the form of a separate substrate—may be read and/or checked using cameras. The information applied to the labels may be in plain text or in the form of graphic codes—for example, in the form of one-dimensional optical codes (for example, barcodes) or two-dimensional optical codes (for example, matrix codes).

Irrespective of the type of optical structures of such a label containing the relevant information, the optical structures must be present and/or produced with sufficient quality—in particular sufficient edge sharpness and sufficient contrast of the graphic structures. In most cases, sufficient optical image quality (for example, sufficient print quality) of the labels must be ensured. Only then can it be ensured in the further course of the production process or in the distribution route of the objects in question (product or packaging), all the way to the end customer, that this information can be read and/or captured correctly using suitable inspection apparatuses.

It is therefore crucial that the quality of such markings is of sufficient quality at the point when they are applied to the products and/or packaging. In practice, in order to check this, optical inspection apparatuses which include a camera are most commonly used for detecting and/or reading such structures, in particular optical codes. The optical structure to be checked is detected by the camera and converted into a digital image. In this case, of course, an analog camera can be used, the analog output signal of which is digitized. Preferably, however, a digital camera which already provides a digital image signal is used. The digital image generated in this manner can then be examined to see whether the optical structure has sufficient image quality. This is usually done by means of suitable software for the analysis of the digital image.

For this purpose, it is of course necessary that the optical inspection apparatus—and in particular, the camera comprised by it—detects the optical structure with sufficient quality. It is therefore necessary to calibrate and/or adjust such optical inspection apparatuses to ensure the reading and/or recognition of the optical structures with sufficient quality and/or reliability.

It should be noted at this point that the term "calibration" in the narrower sense is used to mean a measurement process for the reliably reproducible determination and documentation of the deviation of a measuring device or a material measure as compared to another device or other material measure—in this case, as a reference standard. In the broader sense, the term "calibrate" also means a further step—namely, the consideration of the determined deviation in the subsequent use of the measuring device for the correction of the read values. Instead of taking such a deviation into account for the correction of the measurement result, the measuring device can also be adjusted by setting at least one parameter in such a manner that the measurement result has sufficient accuracy for the relevant application (adjustment of the measuring device). In the following, the term "adjustment" in the narrower sense is used to mean the adjustment of a parameter of the measuring device without a correction of the measured value, using the value determined for the given parameter in the adjustment process. In the broader sense, the term "adjustment" in the following also means a correction of the measured value after the conclusion of the actual measuring operation—that is, the measured value is modified by applying a correction operation (in particular, an arithmetic operation). The correction operation may, for example, consist of an appropriately-signed addition of a correction value to the (actual) measured value and/or a multiplication of the (actual) measured value by a correction factor, or a combination thereof. However, of course, more complex correction operations are possible as well. For example, an image correction of a digital image may be performed by applying a dot operator that calculates a new color value or gray value of a pixel based solely on its own previous color value or gray value and its own previous position in the image, without taking into account the proximity and/or the context of the pixel. Unless explicitly stated below, the term "adjustment" is used in its broader sense.

In the case of the optical test devices for optical codes mentioned above, the use of commercially available reference optical test standards, which have and/or display multiple code representations, is known—wherein each of the code representations corresponds to a particular, predefined quality level. The code representation quality is defined, for example, in the ISO/IEC 15416 standard for bar codes, and in the ISO/IEC 15415 standard for matrix codes. Quality levels are defined by so-called "grading" in these standards. For several parameters of the code representations, such as the minimum reflectivity, the symbol contrast, etc., ranges for each of the parameter values are defined. Each area is assigned a quality level for that parameter. An overall quality level is then determined from the quality levels of the individual parameters. For example, as in ISO/IEC 15415, the lowest quality level of all quality levels for each parameter can be defined as the overall quality level.

The problem so far is the testing and/or calibration of the cameras, and/or the entire inspection apparatus which comprises the camera, in series production, since there must always be a corresponding number of expensive and sensitive reference test standards, each of which must be replaced after a validity period of, for example, two years has expired.

For these kinds of test devices and/or cameras, an adjustment in the field—that is, at the place of use of the test device—has previously been either very difficult, or simply impossible.

The object of the invention is therefore a method for testing and/or adjusting a camera, in particular a digital camera, using an optical test standard, wherein the method can be carried out in a simple and cost-effective manner both by the manufacturer (in the factory of the manufacturer of the camera, or in the field) as well as by the user (by the user of the camera, particularly at the site of use). A further object of the invention is to create an optical inspection apparatus having a camera, wherein the inspection apparatus is designed to enable carrying out the method according to the invention for testing and/or adjustment of the camera. Finally, a further object of the invention is to create a method for producing an optical test standard for carrying out the method.

The invention addresses these objects with the features of claims 1, 11, and 15, respectively.

The invention is based on the approach, for testing and/or adjusting a camera, in particular a digital camera, of not using absolute values of a test standard—and rather using indirect values which are assigned to the test standard by a reference camera. The aim of the test is therefore not the achievement of absolute values of certain parameters (optionally with predetermined allowable deviations), which are directly specified by the test standard—for example, a certain minimum value for the contrast, etc.—but the achievement of reference values which are assigned to the test standard by means of a reference camera. In other words, the aim of the test and/or adjustment is to approximate as closely as possible, with the camera being tested and/or calibrated and/or calibrated, certain parameters or characteristics of a reference camera which have been determined with the test standard.

According to the inventive method for testing and/or adjusting a camera, first an optical test standard is created. For this purpose, a substrate is produced in such a manner that there is a plurality of—and preferably at least three—subareas, each with different grayscale representations, on a surface of the substrate or at least partially embedded in the substrate. Of course, such a substrate can also be obtained as a finished supplier part and used for the further steps. By means of a reference camera, at least one reference image is captured of the surface of the substrate, or of the surface of the substrate through which radiation is transmitted at least in the region of the subareas. For this purpose, the camera has a prespecified configuration comprising at least one parameter. Reference gray values for the individual subareas on the surface of the substrate, or for the subareas at least partially embedded in the substrate, are then determined from the at least one reference image and assigned to the optical substrate.

In the context of the present description, the term "grayscale representation" is understood to mean the following property of a surface of a predefined size: the surface has a substantially homogeneous (local) gray tone distribution, such that the deviations of the (average) gray values of subareas of a specific size (for example, one hundredth or one ten-thousandth of the total area) from an average gray value over the entire area are relatively small (for example, less than 5% and/or 2%, and/or 1%). Greater deviations for very small subareas, which can result from very small contamination or printing errors, are acceptable to a certain extent.

An optical test standard produced in this way can then be used to make a conclusion about an adequate or inadequate adjustment. For this purpose, at least one image of the optical test standard is captured with the camera being tested and/or calibrated, wherein the at least one image is captured with a prespecified configuration of the camera being tested and/or calibrated, the configuration comprising at least one parameter. Actual gray values are determined for the subareas on the substrate surface, or actual gray values are determined for the subareas through which a radiation is transmitted, from the at least one image. When irradiated, the incident radiation on the test standard has a predetermined intensity and/or a predetermined spectrum. The detected gray values may be dependent on the spectrum of the radiation which has passed through the test standard and/or the subareas, and/or on the intensity of this radiation fraction. The deviation of the actual gray values from the reference gray values can then be used to make a conclusion as to whether the adjustment of the camera being tested and/or calibrated satisfies a prespecified requirement.

The method thus allows, in the simplest case, the testing of a camera by means of the test standard which was created using a reference camera (which is as optimally adjusted as possible). The test standard consists of the substrate with the plurality of subareas, each with different grayscale representations, and of the reference gray values assigned to this test standard, irrespective of whether the reference gray values are assigned directly to the test standard (for example, are applied in an optically readable format or are stored on a storage medium directly connected thereto) or are indirectly assigned to the test standard (for example, are stored in a database separate from the test standard or in a separate storage medium and assigned to the test standard by means of a link—for example, the serial number of the test standard). If the camera meets the prespecified test criteria—for example, one of the aforementioned criteria for a permissible maximum deviation of the actual gray values from the reference gray values—then the camera can be found to be in order, and otherwise can be found to be defective. In the latter case, for example, the given camera can be sorted out or, as explained below, subjected to an adjustment.

To carry out this test method, it is preferable to use as a reference camera a camera which is essentially identical to the camera being tested and/or calibrated. However, this is not absolutely necessary as long as the reference camera has largely similar properties as the camera being tested and/or calibrated, in particular as regards the detection of gray values.

The reference camera and/or the camera being tested and/or calibrated can be designed not only as a grayscale camera, but also as color cameras—for example as RGB color cameras. The gray value is then determined from the components of the color image signal.

The substrate of the test standard can preferably be designed as a plate-like or card-like substrate, as is also the case with a large number of reference test standards currently available on the market.

The camera being tested and/or calibrated can be determined to be defective if the actual gray values deviate from the reference gray values by more than a prespecified amount, or are outside a prespecified value range. For example, the amount of the maximum deviation of the actual gray values from the reference gray values for the individual subareas, or the sum of the amounts, or the average of the sum of the amounts can be used as a measure for an adequate adjustment.

According to one embodiment of the invention, the at least one parameter of the configuration of the camera being tested and/or calibrated, for example the exposure time and/or the sensitivity, may be varied for the purpose of adjusting the camera, such that, when the at least one further image of the optical test standard is captured, the actual gray values for the subareas determined from the at least one further image are as close as possible to the reference gray values. As such, an adjustment method is carried out with the aim of determining a camera configuration (that is to say, a value for the at least one parameter which is included in the camera configuration), in which the actual gray values for the subareas of the test standard, which are determined from an image captured with this camera, deviate as little as possible from the reference gray values—or even are identical to the same (adjustment in the narrower sense).

It should be noted at this point that there are a large number of different possibilities for evaluating the deviation of the actual gray values from the reference gray values. For example, the difference between the given actual gray value and the given reference gray value can be determined for each of the plurality of subareas. The deviation can then be defined as, for example, the maximum amount of the differences, the sum or the arithmetic mean of the amounts of the differences, or also the sum of the squares of the differences or the geometric mean of the differences.

As such, all the parameters and/or at least all of the essential parameters of the camera configuration which have an influence on the detection of gray values—that is, in particular, the exposure time and the sensitivity of the camera and/or of the image sensor (including the electrical amplification of the electrical image signal), or else the brightness of a lighting device, for example an LED lighting device, included in the camera for illuminating the objects to be captured, can be checked and/or adjusted by the test standard having a plurality of subareas each with different grayscale representations. In an embodiment in which radiation is transmitted through the test standard, it is of course possible to provide a suitable radiation source which is designed to generate a suitable electromagnetic radiation (for example, X-ray radiation or terahertz radiation).

Of course, to adjust a camera, one or more steps can be carried out—for example, in an iterative method with different configurations of the relevant camera in each iteration. The amount and/or the direction of the change of the at least one parameter of the configuration can be varied according to the amounts and/or the directions of the deviations of the actual gray values from the reference gray values ascertained in the preceding step. However, it is also possible to carry out multiple steps, each with different configurations (for example, different, evenly spaced values for one parameter at a time), and to use the configuration for which the smallest deviation was determined, based on the results for the deviations determined in each case. Of course, it is also possible to apply an interpolation method for determining the configuration with the least deviation for the at least one parameter.

According to one embodiment of the method, the camera being tested and/or calibrated can be recognized as being adequately adjusted (adjustment in the broader sense) if a deviation of the actual gray values from the reference gray values lies within a prespecified permissible range, and/or can be recognized as incorrectly adjusted if the deviation of the actual gray values from the reference gray values is outside the permissible range. This evaluation can be made not only after carrying out the adjustment process in the above-described manner, but also before starting an adjustment in which the at least one parameter of the camera configuration of the camera being adjusted is varied for the purpose of determining an optimum—or at least, permissible—configuration. If an adequate adjustment is ascertained even before the start of an adjustment, it is not necessary to carry out an adjustment.

If the camera being tested and/or calibrated is recognized as being adequately (correctly) adjusted, then the camera can be marked accordingly. This can be done, for example, by a corresponding direct visual identification (test mark), or by a separate indirect identification (test certificate) which is stored in a database—linked, for example, via the serial number of the camera. Otherwise, the camera can be marked as defective and/or can be sorted out. The marking can also be made directly or indirectly in this case. Instead of this manner of a good/bad conclusion, the camera can be classified into quality levels, wherein the quality levels can be defined, for example, by different tolerance ranges for the deviations of the actual gray values from the reference gray values. The classification corresponding to a quality level, determined in this way, can also be assigned to the camera in the above manner.

According to a further embodiment of the invention, for the adjustment of the camera being tested and/or calibrated (adjustment in the narrower sense), the at least one parameter of the configuration, for example the exposure time and/or the sensitivity, can be varied in such a manner that, when at least one further image of the optical test standard is captured, the actual gray values for the subareas, determined from the at least one further image, are each within a prespecified value range for permissible actual gray values, or a deviation of the actual gray values from the reference gray values is within a prespecified permissible range. If it is possible to vary the at least one parameter in such a manner that one of the aforementioned conditions is met, then the camera can be recognized as adequately adjusted and optionally marked accordingly.

This variant of an adjustment method can therefore also be carried out in such a way that a verification is made after each step to determine whether the deviation of the actual gray values from the reference gray values is within a permissible range. As soon as the deviation determined in this manner is within a permissible range, the method can be ended. Instead of a deviation, it is also possible to examine, for each gray value point—that is to say, for each of the subareas with a specific gray value, whether the actual gray value determined by the camera lies within a value range for permissible actual gray values assigned to the relevant gray value point and/or the relevant subarea. If, after such a method step is carried out, the condition which must be fulfilled is met—for example, because all the actual gray values determined by the camera from the image taken with the configuration in question are within the prespecified value ranges for permissible actual gray values—then the method can be ended. The 'correctly adjusted' marking can then be made as described above.

The adjustment method can be terminated without success if a corresponding negative termination criterion is met. For example, a maximum number of adjustment steps (that is, capturing one image with each of the prespecified configurations and verifying whether the determined deviation is within a permissible range) can be specified. If an adequate adjustment has not yet been achieved after the maximum number of adjustment steps has been carried out, then the camera can be identified as defective and correspondingly marked and/or sorted out.

According to one embodiment of the method, the camera being tested and/or calibrated can be assigned an adjustment configuration which comprises the at least one parameter, and which comprises the value of the at least one varied parameter as adjustment data (or as a part of the adjustment data), wherein for this adjustment configuration, the camera being tested and/or calibrated has been recognized as adequately adjusted. The adjustment configuration is the configuration with which the camera is operated in later use. The assignment can preferably take place by storing the adjustment data (at least the value of the at least one parameter) in an adjustment data memory of the given camera, provided for this purpose. This adjustment data memory can in particular be designed as a non-volatile memory protected against access by unauthorized persons. The adjustment data can also be assigned to the given camera by the adjustment data being stored in a memory which is separate from the camera, and a link being created between the adjustment data and the given camera. The link can be generated, for example, by assigning the serial number of the camera to the adjustment data. The external memory can of course be protected against access by unauthorized persons.

According to a further embodiment of the method, a conclusion can be made, from a comparison of the actual gray values and the reference gray values, as to whether the camera being tested and/or being adjusted delivers correctable images with adequate quality in a working mode of the camera with the configuration with which the actual gray values were determined. If so, an operator, preferably a dot operator, for correcting the gray values of images which the camera detects in a working mode, can be determined from the actual gray values and the reference gray values. As such, no adjustment in the narrower sense is carried out; rather, a correction (of the image) of the camera is performed.

This conclusion can be made, for example, in such a way that the maximum difference between the actual gray values and the reference gray values (for the same subarea in each case) is determined. If the maximum difference is too great, the correctability can be negated.

The correctability must also to be negated, in particular, if the comparison between the actual gray values and the reference gray values reveals that a correction would lead to a corrected image which is extremely noisy (for example, because the actual gray values are far below the reference gray values), or if the comparison—or the actual gray values alone—indicates that the camera being adjusted has become saturated for one or more actual gray value data points.

The correction operator for correcting the gray value of images, provided in a working mode by the camera being tested and/or calibrated, can be generated, for example, by determining a correction value for each possible grayscale level (for example, 255 possible grayscale levels for an 8-bit representation of the grayscale levels). To determine such a point operator, the reference gray values and the actual gray values can be linked in a suitable manner. Then, by applying the dot operator, a corrected gray value is assigned, from each actual gray value of a pixel of the image supplied by the camera being adjusted (irrespective of whether the camera itself provides a digital image signal or an analog image signal which is first converted into a digital image by digitization), such that a corrected digital image is generated which can then be subjected to further processing steps—in particular, evaluation steps.

The correction operator can be designed, for example, such that a correction value is added to each gray value of a pixel (with the correct sign). For determining the correction values for all grayscale levels—for example, for each of N subareas having different grayscale representations, the difference $\Delta G_i = G_{ist,i} - G_{ref,i}$ can be determined, where i is the number of the given subarea ($1 \leq i \leq N$), $G_{ist,i}$ is the actual gray value of the given subarea, $G_{ref,i}$ is the reference gray value of the given subarea, and $\Delta G_i$ is the gray value difference for the given subarea. These points for the gray value differences can then be used as data points for a (linear or non-linear) interpolation so as to determine a correction value of the correction operator for each grayscale level. For this purpose, the interpolation data points can consist, in a Cartesian (x, y) coordinate system, of the reference gray values $G_{ref,i}$ as the x-coordinate and the gray value difference as the y-coordinate.

It should be expressly understood that the variants described above for adjusting a camera in the narrower sense and for correcting (the image) of a camera can be used either isolated from each other, or in combination. In particular, an adjustment in the narrower sense can be made initially, and the remaining residual error can be further reduced by a subsequent correction—or even substantially eliminated.

The prespecified configuration of the reference camera can be designed or selected such that, with this configuration, an optimal or at least adequate quality of the at least one captured reference image is achieved. The image quality can be defined in this case by one or more parameters—for example, the contrast, the sharpness of the depiction of edges, the brightness, etc.

According to one embodiment of the invention, the method can be used in particular if the reference camera is part of a reference inspection apparatus used for checking optical structures, and if the camera being tested and/or calibrated is part of an inspection apparatus being tested and/or calibrated, for checking optical structures.

As mentioned above, such inspection apparatuses are used in a variety of ways—for example, to inspect optical codes applied to products or packages or to inspect any other optical structures, including checking whether all components on an automatically produced circuit board are properly installed and present. It should be noted that the term "inspection apparatus" in the present description is used both for devices which actually check—and optionally, evaluate—certain quality features of an optical structure, as well as for pure recognition devices which assign meaning to an optical structure. Such a recognition device can particularly be a reader for optical codes.

According to a further embodiment of the method according to the invention, the adjustment of the reference camera can be performed using an optical primary standard on which a plurality of optical structures is provided, each having an associated imaging quality level, wherein the optical structures are optical codes, and in particular bar codes or matrix codes, by way of example, and wherein the configuration of the reference camera is determined in such a way that, from an image of the optical primary standard captured with this configuration, the optical structures are assigned the correct quality level.

In the case of optical code inspection apparatuses, as mentioned above, corresponding quality levels are specified in ISO/IEC 15416 for bar codes and ISO/IEC 15415 for matrix codes. However, it is of course also possible to define suitable quality levels for any other optical structures to which a meaning will be assigned. The reference camera and/or the corresponding reference inspection apparatus is configured to carry out the method (that is, to determine the reference gray values) in such a manner that it produces the best possible image of the primary standard, and assigns the correct image quality level to all structures provided on the optical primary standard (or to those which are actually required).

According to the method of the invention, the camera being tested and/or calibrated is specifically compared with the reference camera only with regard to the detection of gray values, and/or is adjusted to this property of the reference camera. It is assumed that in practice other (less critical) parameters of the camera or inspection apparatus being tested and/or calibrated are either negligible, or a different approach can be used to ensure that the values for these parameters lie in permissible and/or correct value ranges.

For example, for fixed focal length cameras or inspection apparatuses, correct mounting and/or positioning of the camera and/or inspection apparatus can ensure that a permissible distance from an object is maintained. The production of a camera with a defined fixed focal length can also be ensured by appropriate measures in the production, in particular compliance with appropriate assembly tolerances and the use of optical elements within acceptable tolerances. A subsequent, undesirable change in focal length over time is unlikely.

The same applies to the resolution of a digital camera. In this case as well, hardly any change in this property over the life of the camera is expected.

As such, the essential critical parameter which remains in most cases is the image brightness remains—as a critical parameter in the generation of an image of an optical structure being tested and/or being detected. The image brightness is dependent on the exposure time and/or the sensitivity of the camera and/or the image sensor, including an electrical amplification of the generated electrical image signal. The sensitivity and also the linearity of an image sensor, in particular of a digital image sensor, can fluctuate within relatively wide limits, and also change over the service life of the camera—for example, as a result of aging processes of the image sensor. The illumination device and/or the device for generating a radiation which is transmitted through the test standard are also subject to aging.

It should be noted at this point that the image sensor for the method and the apparatus according to the invention can be designed both as a line sensor (single or multi-line) for scanning the optical structure being detected (by a relative movement of the line sensor and the optical structure being detected), or as an area sensor which detects the optical structure being detected at one time (that is, the area of the sensor is chosen to be large enough that the optical structure being detected can be fully imaged on the sensor surface).

As such, the advantage of the method according to the invention is, on the one hand, that a comparison of the properties, for detecting gray values of a camera being tested and/or calibrated with respect to a reference camera can be carried out in a simple manner. On the other hand, in those cases in which further parameters or characteristics of the camera being tested and/or calibrated are not critical, or are easily checked and/or ensured in another manner, when a camera being checked and/or adjusted is found to be correct, or correctly adjusted, it can be assumed that this camera does not differ from the reference camera in an impermissible manner with respect to the other parameters or properties.

The method therefore makes possible, for the manufacturer of such cameras or inspection apparatuses, simple quality assurance (testing) or adjustment of the cameras. In addition, a check and/or readjustment of the camera by means of an optical test standard according to the invention can also be carried out in a simple manner by the user of the camera—i.e., in the field.

An optical inspection apparatus according to the present invention comprises a camera and an evaluation and control unit to which the image signal generated by the camera, or digital image data generated by the camera, is fed. The evaluation and control unit is designed in such a manner that it can be switched into a test mode in which the method according to the invention is carried out. That means that the evaluation and control unit controls the camera in such a manner that at least one image of an optical test standard having a plurality of subareas each with different grayscale representations is captured with a prespecified configuration of the camera comprising at least one parameter. As the next step in the test mode, the evaluation and control unit determines from the image signal fed to it, or the digital image data, actual gray values for the subareas from the at least one image.

Of course, multiple images can be captured and an average taken for each pixel of the image, to reduce the noise of the image data.

In order to determine the actual gray values for the multiple subareas, the evaluation and control unit can use the entire subarea or a specific subarea in each case. A subarea can be determined, for example, on the basis of the reflected outer boundaries of the given subarea, for example by masking out an edge area of a prespecified width. The actual gray value for the entire given area can then be determined as the average of the grayscale levels of all pixels of the given area. Of course, this procedure can likewise be used when determining the reference gray values by means of the reference camera.

In a concluding step, the evaluation and control unit compares the actual gray values with the relevant reference gray value data or value ranges for permissible actual gray values to produce a conclusion about an adequate or inadequate adjustment of the camera. The reference gray values can be stored in the evaluation and control unit or supplied to it externally. The same applies to the value ranges for permissible actual gray values.

Of course, the evaluation and control unit can also be designed in such a manner that it performs not only a test (that is, the evaluation) of the camera, but also further method steps for the adjustment (that is, for an adjustment in the narrower sense; or for correcting the image data), as have been explained above.

According to one embodiment of the invention, a holding device for the optical test standard can be included, and can be detachably connectable to the optical inspection apparatus—preferably by plugging—or can be permanently connected to the optical inspection apparatus. The holding device in this case is designed in such a manner that the optical test standard is held at a defined distance (in the optical axis) relative to the camera. As a result, a test and/or adjustment of the camera can be performed in a simple manner.

The holding device is preferably also designed in such a manner that the optical test standard is held in a defined position in a plane substantially perpendicular to the optical axis of the camera, wherein the optical test standard can preferably be inserted into the holding device and can be removed from the same.

The holding device in this case is also designed in such a manner that the test standard is held in substantially the same position in both the inspection apparatus being tested and/or calibrated and the reference device.

The method for producing an optical test standard for testing and/or adjusting a camera according to the invention has already been explained in detail above in connection with the testing and/or adjustment method overall. In this case, a preferably plate-like or card-like substrate is produced for the test standard, or used for the further steps, wherein a plurality of subareas with different grayscale representations is provided on a surface of the substrate. Subsequently, a reference image of the substrate is captured by means of a reference camera, which is preferably constructed substantially identically to the camera being tested and/or calibrated, wherein, for this purpose, the reference camera has a prespecified configuration comprising at least one parameter. Finally, in the manner described above, reference gray values for the subareas are determined from the reference image, and these are assigned to the substrate.

The reference gray values can be assigned to the substrate by applying the data to the substrate in optically readable form and/or by storing the reference gray values in a memory provided in or on the substrate.

According to one embodiment, further information and/or data can also be assigned to the substrate—in particular, a date of manufacture, an end date defining the validity of the optical test standard, a period of use, a serial number of the optical test standard, a serial number and/or type information of the camera being tested and/or calibrated, and/or a serial number and/or type information of the reference camera.

Such a simple test standard can particularly also be created by a manufacturer of cameras or optical inspection apparatuses along with a camera itself. It is also possible to provide such a test standard to a user of such a camera or inspection apparatus, such that the latter can carry out the testing and/or adjustment of the camera himself or herself—specifically, in the field. It is likewise possible to assign such a test standard to a camera and/or inspection apparatus, wherein the assignment can be made, for example, by the serial number of the camera or inspection apparatus (for example, by printing the serial number of the camera and/or inspection apparatus on the test standard, or applying a corresponding adhesive label).

The configuration of the reference camera for the production of the optical test standard can be done in the manner described above, by using a primary standard.

Further embodiments of the method for testing and/or adjusting a camera and/or for producing an optical test standard, and embodiments of the optical inspection apparatus according to the invention for testing and/or detecting optical structures, will become apparent from the dependent claims.

It should be noted that the method according to the invention for testing and/or adjusting a camera and/or the optical inspection apparatus according to the invention, which has such a camera, and the inventive method for producing a suitable optical test standard, can also be used in the field of X-radiation or terahertz radiation. The term 'optical test standard' therefore also encompasses, in the most general sense, test standards of which an optical image can be generated by a camera having any arbitrary configuration. In addition to purely optical cameras, which detect light in the visible electromagnetic spectrum, any camera which is designed to detect electromagnetic radiation of any frequency—for example, X-radiation or radiation in the terahertz range—can be used.

Since X-radiation, and also terahertz radiation, is usually used to irradiate objects, the optical test standard according to the invention can also be designed in such a manner that the subareas with different grayscale representations do not produce a gray value in the visible optical spectrum, but rather produce a gray value in the relevant spectral region in which a test and/or adjustment of the camera will be performed. The subareas can, for example, consist of different materials and/or have different thicknesses, such that in each case a certain gray value is generated upon irradiation with radiation of a prespecified spectrum (of any frequency position) and detection of the radiation with the respective camera generates, in each case, a certain gray value (for example, as a function of the spectrum of the detected radiation and/or the intensity of the detected radiation in the region of the radiation-sensitive detector of the camera). The subareas and/or the materials of the subareas can be provided on the surface of the substrate and/or embedded in the material of the substrate.

Figure 1:
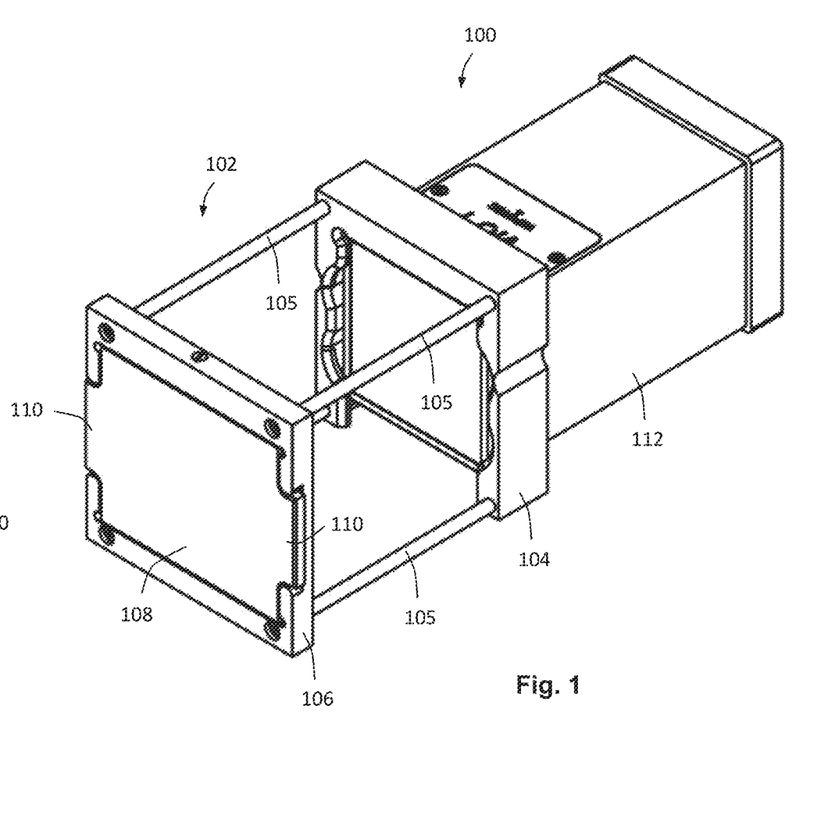
FIG. 1 shows a perspective view of an optical inspection apparatus for testing and/or recognition of optical structures, in particular of optical codes, having a holding device and an optical test standard held in the holding device.

FIG. 1 shows a camera 100 which can be designed, in particular, as a grayscale digital camera with a corresponding digital image sensor. With regard to its properties, in particular its imaging optics (not shown) and with regard to its resolution, the camera 100 is designed in such a manner that it can be used for an inspection apparatus for testing and/or detecting optical structures, in particular optical codes.

For example, a grayscale digital camera 100 can be configured in such a manner that the gray value of the image information generated by each pixel of a digital sensor of the camera 100 can assume 255 grayscale levels. The image information of each pixel can thus be represented by 8 bits.

However, the camera 100 can also be designed as a digital color camera, in which case a corresponding gray value can be determined for each pixel from the digital color signal and/or the individual components of the digital color signal (for example, the components R, B, G of an RGB color signal). For the conversion of a color signal into a grayscale signal and/or the conversion of a color image into a grayscale image, there are various methods that are known to a person skilled in the art. Accordingly, a more detailed explanation of these methods can be omitted in the context of the present description. Finally, the camera can also be designed as an X-ray camera or as a terahertz camera and/or in general as a camera that is capable of detecting electromagnetic radiation outside the spectrum of visible light.

In FIG. 1, the camera 100 is connected to a holder 102 which is made of a first frame part 104 designed in a U shape, and a second frame part 106 designed as a rectangular closed ring, as well as four connecting struts 105 which connect the two rectangular frame parts 104, 106 to each other at the corner areas.

As can be seen from FIG. 1, the first frame part 104 is made to be placed on, and preferably pushed onto, the front area of the camera 100. The frame part 104 is designed for this purpose in such a manner that it is connected to the camera 100 in a defined position perpendicular to the longitudinal axis of the same. Preferably, the holder 102 and/or the frame part 104 can be embodied and can cooperate in such a manner that the frame part 104 locks releasably with the camera 100 in the defined position.

Figure 2:
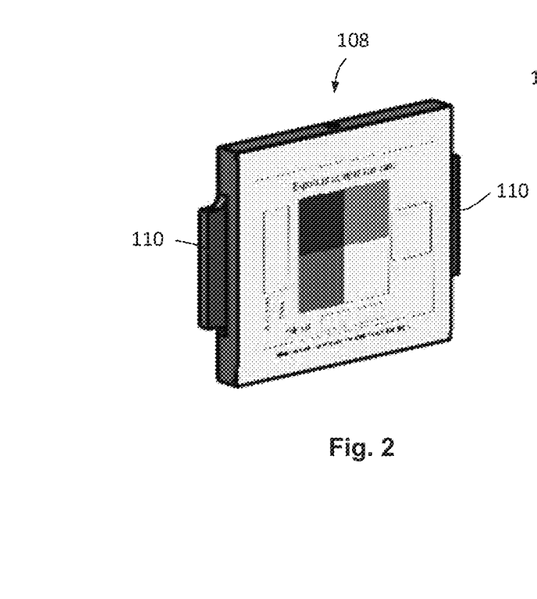
FIG. 2 shows a perspective view of the optical test standard in FIG. 1.

The second frame part 106 serves to receive and/or hold a test standard 108, the function of which will be explained below. The test standard 108, as shown in FIG. 1, has a plate-like or card-like design. The test standard 108 has lateral extensions 110 on its substantially rectangular circumference, which engage in corresponding recesses of the frame part 106. On its surface facing the camera 100, the test standard 108 has optical information (see FIG. 2) which serves to test and/or adjust the camera 100. As stated above, the optical information can be provided directly on the surface of a substrate of the test standard and/or embedded in the material of the substrate.

Figure 3:
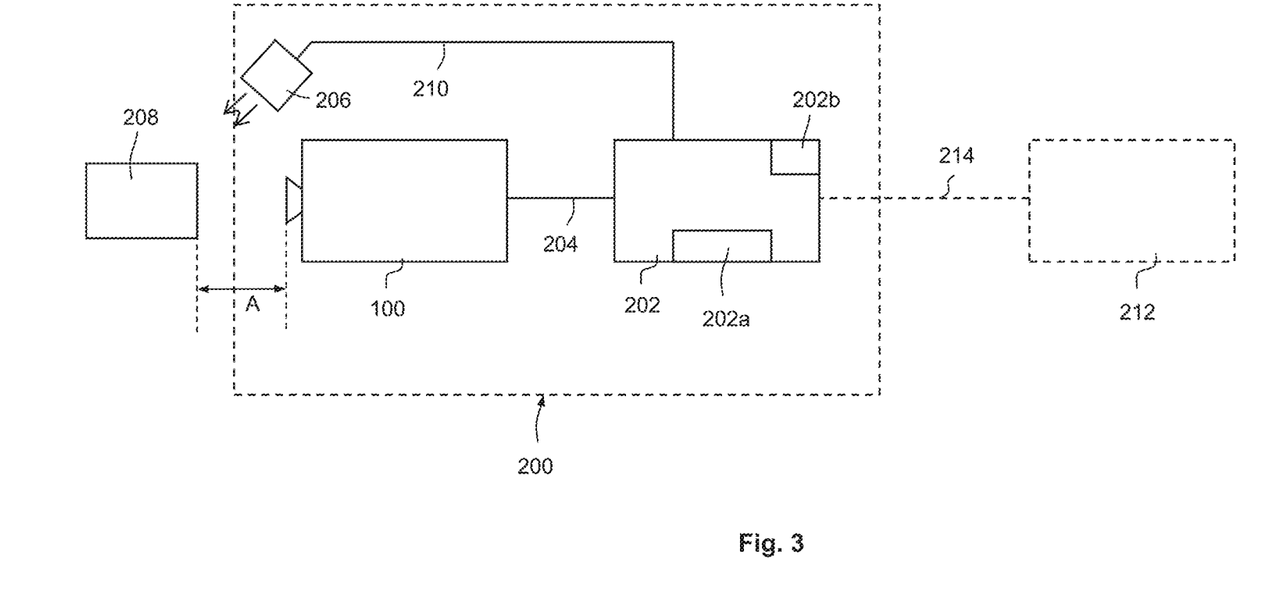
FIG. 3 shows a schematic block diagram of an inspection apparatus according to FIG. 1, in an operating environment.

FIG. 3 shows a schematic block diagram of an inspection apparatus 200 for testing and/or detecting optical structures—for example, optical codes in the form of bar codes or matrix codes. The inspection apparatus 200 consists of a camera 100, as has been explained above with reference to FIG. 1, and an evaluation and control unit 202. These are connected via a communication connection 204. The communication connection 204, like all other communication connections, can be implemented in hardwired or wireless form—in particular by encrypted communication.

Furthermore, the inspection apparatus 200 comprises an illumination unit 206 for adequate illumination of an object 208 being inspected (being tested and/or detected). The object 208 represents by way of example a plurality of objects of a flow of goods which will be inspected by the inspection apparatus 200 at high speed. Objects 208 in this case are passed as a flow of goods one after the other at a target distance A from the camera 100, wherein the deviations of the actual distance from the target distance A must be within prespecified tolerances in order to ensure an adequately sharp image of the surface of an object 208 being inspected. The actual distance must be within the depth of field of the camera 100.

For the inspection of an object 208, the evaluation and control unit 202 controls the camera 100 via the communication connection 204, and the illumination unit 206 via a communication connection 210 in a manner which is suitable for obtaining image data of the object 208. For this purpose, the evaluation and control unit 202 can activate the illumination unit 206 in such a manner that the object 208 is irradiated with a predetermined, defined optical power. The optical power is preferably kept constant by the evaluation and control unit 202 during the period in which the image acquisition takes place (exposure time). The illumination unit can particularly comprise one or more light emitting diodes (LEDs—not shown).

As explained above, the illumination unit can also be designed to generate a radiation which penetrates the test standard—in particular, X-radiation or terahertz radiation. In this case, the illumination device must be positioned in such a manner that the test standard and/or the object to be irradiated is positioned between the illumination unit and the camera 100.

The memory 202a is used for storing data, in particular values for parameters, by means of which the camera 100 and preferably additionally the illumination unit 206 can be activated for capturing images of the object 208. These can also be parameter values which are used to adjust the camera 100. These parameter values can be supplied to the evaluation and control unit 202 either from an external unit and/or can be determined by the evaluation and control unit 202 from the supplied signals or data which is fed to it—in particular, the image signal or the image data which is fed to the evaluation and control unit 202 of the camera 100 via the communication connection 204. Data or parameter values which will be stored in the memory 202a may be values for the exposure time, aperture, focal length, white balance and sensitivity of the camera, as well as parameter values for controlling the illumination unit 206—for example, the current and/or the voltage for controlling the actual lighting means of the illumination unit 206.

It should be pointed out that the evaluation and control unit 202, and/or solely individual components and/or functionalities thereof, can also be integrated with the camera 100 or can be implemented in the same. In particular, the control of the illumination unit 206 and/or the storage of parameter values can be carried out in the camera 100—that is, the memory 202a and possibly also a switch 202b which, among other things, can switch to allow access to the memory 202a, can be realized in the camera 100 and/or inside its housing. The evaluation and control unit 202 can also consist of a plurality of sub-components—optionally arranged in a distributed configuration. One or more of these subcomponents can be integrally formed with the camera 100 and can be provided, for example, in a housing 112 of the camera.

The evaluation and control unit 202 can also be connected to a higher-level data processing unit 212—for example, a personal computer or a network component—via a communication connection 214. The higher-level unit may, for example, transmit to the test apparatus 200 and/or the evaluation and control unit 202 the starting time point when the inspection of the products 208 should begin, and can receive the results of the inspection from the evaluation and control unit.

The evaluation and control unit 202 is designed in such a manner that it can be switched into a test mode. This can be done either by supplying an external signal from the higher-level data processing unit 212 via the communication connection 214 to the evaluation and control unit 202 or, for example, by means of the switch 202b, by means of which access to the memory 202a can be granted at the same time.

In the test mode, the evaluation and control unit 202 controls the camera 100 in such a way that the image provided by the camera 100 is verified to determine whether this image has adequate quality for the detection of optical structures.

Since certain parameters in a digital camera are rather uncritical, it is sufficient in many cases to design the test mode in such a way that only certain critical parameters are subjected to a test.

The uncritical parameters are often parameters which are either barely subject to a long-term fluctuation, or which can be checked easily and with little effort by means of a simple optical verification by an operator or by simple—for example, mechanical—measurements in another way. Such parameters are, for example, the focal length or the imaging properties of the optics of the camera.

In contrast, critical parameters of the camera 100 of an inspection apparatus are, in particular, parameters which influence the gray scale values of the image captured by the camera—for example, the exposure time or the sensitivity of the digital image sensor of the camera 100, i.e., the electrical amplification of the electrical image signal supplied by the digital image sensor. These parameters can be easily adjusted, as discussed below, or at least checked to see if their values are adjusted in such a manner that the camera provides an image of adequate quality to allow recognition of the optical structures. The same also applies for the parameters which define the illumination properties of the illumination unit 206.

For this purpose, the holder 102 is first connected to the camera 100 of the inspection apparatus 200, for example by being plugged onto and locked to it. Subsequently, the test standard 108 is inserted into the receiving opening of the second frame part 106. Of course, the test standard 108 can also be permanently situated in the receiving opening of the holder 102 or be permanently connected thereto.

The holder 102 is designed in such a manner that the test standard 108 is held at a predetermined, correct distance in front of the camera 100 (measured in the optical axis direction of the camera 100). The predetermined correct distance (test distance) can be determined in such a manner that the surface of the test standard 108 facing the camera 100, on which test information to be evaluated is located, is in the center of the depth of field. The test distance can particularly correspond to the target distance A at which the objects 208 are moved past the inspection apparatus 200 in the normal operating mode of the same.

The inspection apparatus 200 and/or the evaluation and control unit 202 can already be in test mode at this point in time, or may only be put into the test mode subsequently— for example, by actuation of the switch 202b. In a further step, the evaluation and control unit 202 controls the camera 100 in such a way that an image of the test standard 108 is captured. The image comprises at least one relevant subarea of the information contained on the surface of the test standard 108 facing the camera 100.

Figure 4:
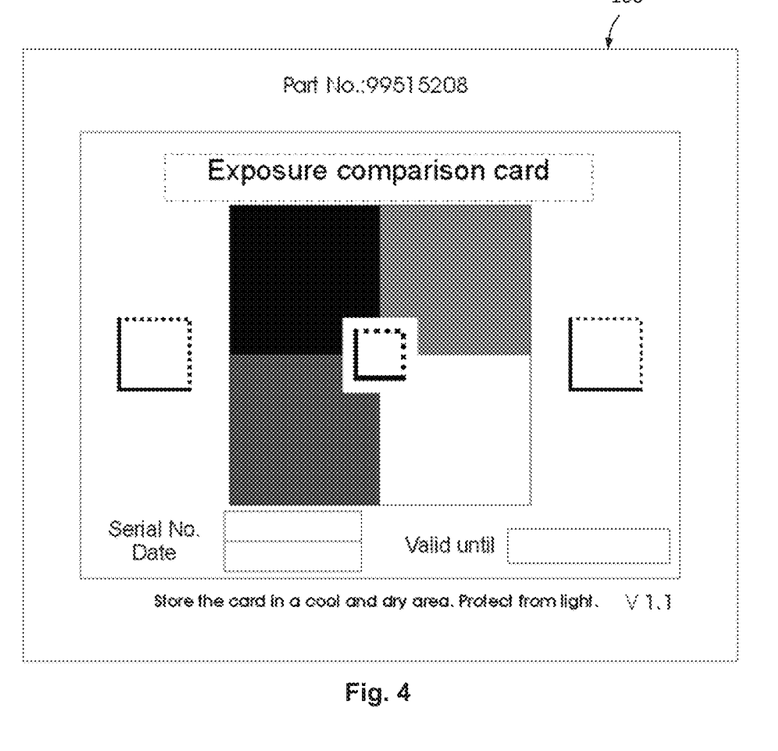
FIG. 4 shows an enlarged view of the optical components of a test standard similar to FIG. 2.
Figure 5A:
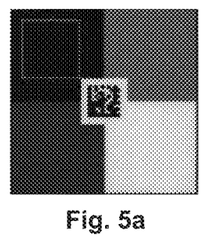
FIG. 5 shows representations of images of the grayscale representations of the test standard in FIG. 4 taken by a reference camera, wherein each of the subareas is detected and evaluated with respect to the gray value of an inner part of the given subarea (FIGS. 5a to 5d)
Figure 5B:
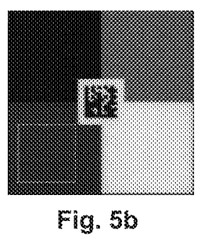
Figure 5C:
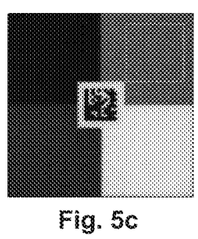
Figure 5D:
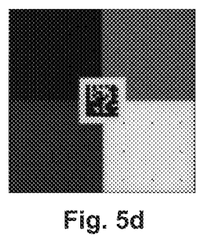
Figure 6A:
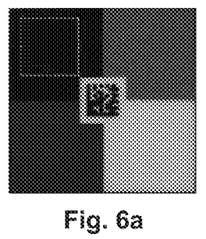
FIG. 6 shows representations of images of the grayscale representations of the test standard in FIG. 4 taken by a camera being tested and/or calibrated, wherein each of the subareas is detected and evaluated with respect to the gray value of an inner part of the given subarea (FIGS. 6a to 6d)
Figure 6B:
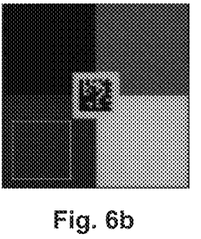
Figure 6C:
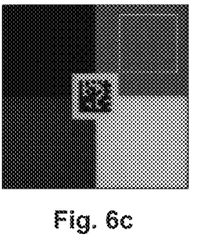
Figure 6D:
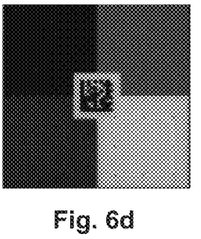

FIG. 4 schematically shows the test information provided on the surface of the test standard 108 facing the camera 100. In particular, this test information comprises a plurality of substantially square subareas (in the embodiment shown, four) which each contain different grayscale representations. The grayscale representation of each subarea should be adequately homogeneous in this case. In order to enable a test and/or adjustment of the camera being tested and/or calibrated over the entire gray area—that is, from ideal-white to ideal-black—with adequate precision, it is expedient to select gray values of the plurality of grayscale representations from the greatest possible distribution over the entire gray area. This ensures that adequately distributed data points for the gray values are available for the interpolation. For example, as shown in FIG. 4, a first subarea can have a gray value near white, a second subarea can have a gray value near black, a third subarea can have a lighter gray value, and a fourth subarea can have a darker gray value.

Figure 8:
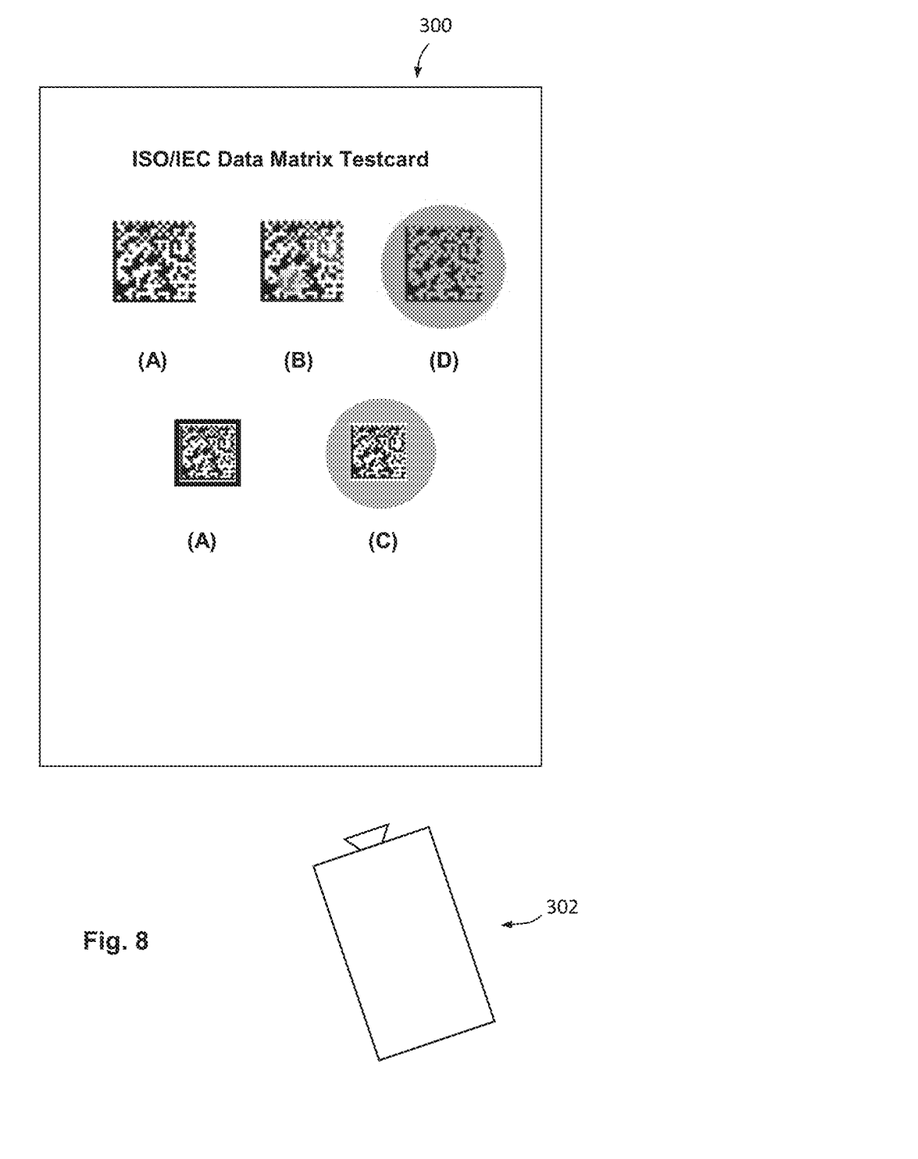
FIG. 8 shows a schematic representation of the test information of a test standard for optimal configuration of a reference camera.

The test standard 108 further contains reference gray values which are determined by means of a reference camera 302 (FIG. 8). The reference camera 302 is preferably identical to the camera 100 which is being tested and/or calibrated using the test standard 108. The reference camera 302 is optimally adjusted in advance. An image of the test standard 108 is captured with this optimum configuration. For this purpose, the test standard 108 is held at a distance in front of the reference camera 302 which is equal to the distance set during use of the holder 102 in conjunction with the camera 100 being tested and/or calibrated. Preferably, the image of the test standard 108 can also be captured by means of the reference camera 302, also using a similar holder 102, or even using the same holder 102 which will later be used for testing and/or adjusting the relevant camera 100.

From the captured image of the test standard 108, an evaluation and control unit which receives the image data from the reference camera 302 first determines the positions of the grayscale representations of the test standard 108. Within the grayscale representations, the evaluation and control unit selects subareas inside each of the individual subareas of the grayscale representations, and these are used to determine the gray values. This is indicated in FIGS. 5a to 5d (each of which shows illustrations of the grayscale representations of the test standard 108 according to FIG. 4) by the rectangular frames inside the various grayscale representations, wherein the frames enclose the subareas of the grayscale representations which are used to determine the gray values. In this case, as shown in FIG. 5, each can be quadratic subareas of the respective grayscale representations. For example, the subareas can be 300×300 pixels in size. From the gray scale values of the individual pixels, a gray value can be calculated for the entire subarea by determining the average of the gray scale values of all the pixels (for example, the 90,000 pixels of a subarea of 300×300 pixels).

It should be noted here that the term "grayscale level" in the present description refers to the possible, discrete (stepwise) gray values of an image pixel or of a larger image area which can be represented with a specific number of bits—for example, 8 bits. The lowest gray value of a grayscale level (black) can be encoded as 0, and the highest gray value of a grayscale level (white) can be encoded with the highest possible value, for example 255 for an 8-bit grayscale representation. The discrete value of a gray scale is also referred to as a gray scale value. The generic term "gray value" can denote both a (discrete) gray scale value and any calculated (no longer discrete) gray value—for example, an average for a multi-pixel area and/or an average for one or more certain pixels (in terms of image position) of an image which is captured multiple times.

Tab. 1 shows, in the upper half thereof, the data that was used and/or acquired by the reference camera 302 when determining the gray values. In the column "Field", the abbreviations LO, LU, RO, RU respectively designate the subarea of 300×300 pixels used for determining the gray value, where LO is the upper left subarea, LU is the lower left subarea, RO is the top right subarea and RU is the bottom right subarea. The "Area" column contains the total number of pixels used to calculate the gray values in each case—i.e., 90,000 pixels. The columns "Mean", "Min" and "Max" respectively denote the average, the minimum and the maximum of the grayscale levels within the subareas, wherein the mean value corresponds to the determined gray value of the given subarea and thus to the respective grayscale representation.

For the brightest subarea (RU) with a near-white gray value, the mean value is 211,549, and for the darkest subarea (LO) with a near-black gray value, the mean is 12,196. For the area with the lighter gray (RO), a mean gray value of 81,191 is obtained; and for the subarea with the darker gray, a mean gray value of 39,553 is obtained wherein, in this case, the camera delivers 8-bit gray values.

These reference gray values determined by means of the reference camera 302 are likewise assigned to the test standard 108. This information may, for example, be contained in a matrix code in the center of the subareas with the grayscale representations. It is also possible to store this information in an RFID chip, which can be contained in a card-like test standard 108. Of course, the information can also be displayed in plain text on the test standard.

The test standard 108 can also, as shown in FIG. 4, include a serial number of the test standard, a date of manufacture, and a validity period as further information. The test standard 108 can also be assigned to a specific camera being tested and/or calibrated. In this case, a serial number or another identifier of the camera being tested and/or calibrated can be displayed on the test standard, or assigned to the test standard in another way.

By means of a test standard 108 of this type, which serves as a test standard which is fed back to the reference camera 302, it is possible to test and/or calibrate or adjust each further camera 100 of identical or sufficiently similar construction. For this purpose, an image of the test standard 108 is also captured by means of the camera 100 being tested and/or calibrated. Of course, a plurality of images can also be captured and an "averaged" image can be obtained by calculating an average value for pixels corresponding to each other by their position (and/or adjacent groups of pixels) from the digital image data of the plurality of images. In this way, it is possible to reduce noise effects in particular.

The image can first be captured by means of the camera 100 being tested and/or calibrated using a starting configuration—that is to say that the relevant parameters, such as, in particular, the exposure time and the sensitivity of the camera, as well as the brightness of the illumination by means of the illumination unit 206, each have a prespecified starting value.

From the captured or calculated digital image, a determination of the gray values for the grayscale representations of the individual subareas is then made in the same way as explained above in the context of the image evaluation by means of the reference camera 302. For this purpose, as far as possible, the same inner subareas of the individual grayscale representations can be used—for example, by using the same square area of, for example, 300×300 pixels in the center of the total square subarea of the respective grayscale representations.

Tab. 1 shows the results of the image shown in FIGS. 6a to 6d, which was captured by means of a camera 100 being tested and/or calibrated, wherein each of the FIGS. 6a to 6d again shows the respectively framed quadratic inner subarea to be evaluated for the nearly-black grayscale representation LO, the darker gray grayscale representation LU, the lighter gray grayscale representation RO, and the nearly-white grayscale representation RU.

As the values in the lower half of Tab. 1 show, the values captured by means of the camera 100 being tested and/or calibrated in the illustrated example are each below the reference gray values ascertained by means of the reference camera 302.

Figure 7:
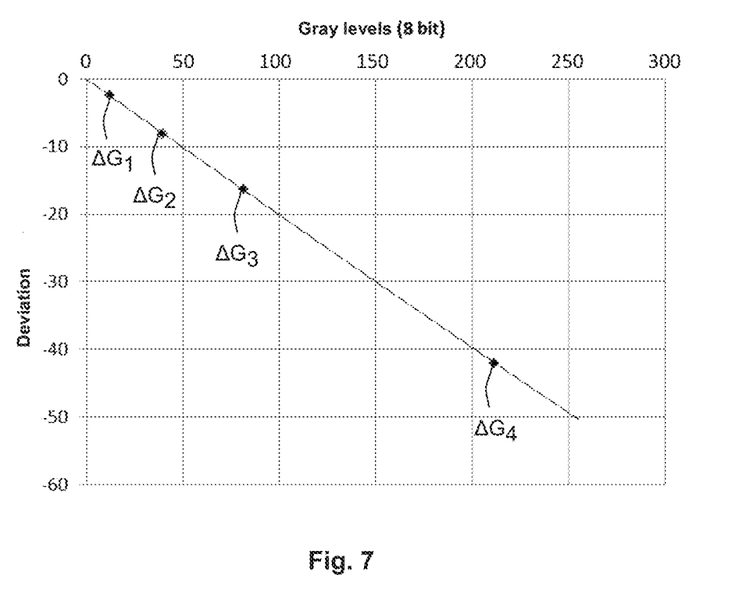
FIG. 7 shows a diagram for explaining the correction of the gray values of the image of a camera being tested and/or calibrated, with a curve which depicts the deviation of the gray values detected by the camera being tested and/or calibrated from the gray values of the test standard detected by the reference camera.

FIG. 7 shows a graphical representation of the deviations and/or differences $\Delta G_i = G_{ist,i} - G_{ref,i}$ between the actual gray values $G_{ist,i}$ ascertained by the camera 100 being tested and/or calibrated for the individual subareas of the grayscale representations, and the reference gray values $G_{ref,i}$ ascertained by the reference camera 302 and assigned to the test standard 108. In this case, the index i designates the individual grayscale representations, where i=1 denotes the nearly-black grayscale representations, i=2 the darker gray grayscale representations, i=3 the lighter gray grayscale representations, and i=4 the nearly-white grayscale representations. Reference gray values $G_{ref,i}$ are plotted on the x-axis in the scale of the absolute gray values 0 to 255 in an 8-bit representation, and the deviations $\Delta G_i$ (likewise in a linear scale of 8-bit gray value differences) are plotted on the y-axis.

As can be seen in FIG. 7, the deviation $\Delta G_i$ increases with increasing values of i, wherein the increase in the selected linear representation (the gray values of the 255 grayscale levels are plotted on the x-axis, and the deviation $\Delta G_i$ is plotted on the y-axis) is approximately linear. FIG. 7 also shows both the four discrete data points of the difference $\Delta G_i$ ($1 \leq i \leq 4$) and an interpolated curve. According to the measured and/or determined data points, the interpolation can be made, for example, as a linear or polynomial interpolation of a predetermined order.

If the camera 100 is only being tested and/or calibrated (in the narrower sense), the determined maximum deviation $\Delta G_i$ can then be checked to see whether it is smaller than a prespecified (permissible) maximum deviation. If this is the case, the camera 100 and/or the inspection apparatus 200 comprising the camera 100 can continue to be used. If the maximum permissible deviation is exceeded, the camera 100 and/or the relevant inspection apparatus 200 can be taken out of service and/or sorted out.

Alternatively, an attempt can be made to adjust the camera 100 and/or the inspection apparatus 200—that is, to determine a configuration for the relevant parameters which ensures that the prespecified maximum deviation $\Delta G_i$ is maintained. For this purpose, one or more parameters can be varied in an iterative process, by way of example, wherein after each variation of one or more parameters, an image is captured again by means of the camera 100 and this image is again checked in the manner explained above to determine whether the prespecified maximum deviation is respected.

The iterative method can be continued until the maximum permissible deviation $\Delta G_i$ (the first time) is respected. Alternatively, the iterative method can be carried out until an optimal configuration of the camera 100 is reached—that is, until the deviation $\Delta G_i$ reaches its minimum value. Of course, a termination criterion can be provided. When it is reached, the method is terminated, even if no permissible maximum deviation or optimal configuration has been reached.

If the maximum permissible deviation $\Delta G_i$ in the embodiment explained above with reference to FIG. 5 to FIG. 7 and Tab. 1 were fixed as $\Delta G_i = \pm 10$, then the exposure time could be increased, for example. This would result in a relatively brighter image of the brighter grayscale representations relative to the darker grayscale representations—that is, the approximately linear curve shown in FIG. 7 would be shifted up and the negative slope would be less strongly negative. In this way, the prespecified permissible deviation of $\Delta G_i = \pm 10$ could be respected.

A similar effect could also be achieved by increasing the electrical gain of the camera 100. In addition, by raising the optical power of the illumination unit 206 of the inspection apparatus 200, a comparable effect can be achieved.

The values determined in this way for the relevant parameters—that is, the relevant configuration of the camera 100 and/or the inspection apparatus 200, can then be stored in the memory 202a. The camera 100 and/or inspection apparatus 200 adjusted in this manner can then be further used, wherein in the working mode thereof, correct function is thereby ensured.

Instead of varying certain configuration parameters of the camera 100 and/or inspection apparatus 200 in the context of the adjusting methods described above (adjustment in the narrower sense), a digital image correction can also be undertaken. For example, after each step, a digital correction of the image can be performed, and then a verification can be made to determine whether the correction was adequate or optimal. If not, further correction steps can be carried out. The image correction can also be carried out in addition to the adjustment (in the narrower sense), in particular after the completion of the adjustment in the narrower sense (here, too, one or more iterative correction steps are possible).

For the correction, as described above, an image of the test standard 108 can be captured first, and the curve shown in FIG. 7 can be determined from the image. If the image correction is to be performed in addition to a previous adjustment, then a corresponding curve can also be determined from an image which was captured with the adjusted configuration of the camera 100 and/or inspection apparatus 200. The image correction can then take place, for example, such that a correction value is determined for each gray scale value. The correction value corresponds to the deviation $\Delta G(G)$ as a (discrete) function of the gray scale value G. With this manner of image correction, the image of the camera 100 can be largely corrected in such a manner that this image corresponds to the image that would have been captured with the reference camera 302.

After completion of the testing and/or adjustment of the camera 100 and/or of the inspection apparatus 200, the test mode is ended, for example by re-actuating the switch 202b.

The above-described testing and/or adjustment method (adjustment method in the broader sense) can, as already mentioned, be used both in the factory of the manufacturer, for example in the context of quality assurance in the production of such cameras or corresponding devices, or can be used in the field to check already-delivered cameras. The verification and/or adjustment can also be made by the user himself.

Finally, the manner in which the aforementioned optimal adjustment of the reference camera 302 can be undertaken will be described below. Of course, the reference camera 302 can also be part of a reference inspection apparatus.

A primary standard 300, shown schematically in FIG. 8, can be used as a means for determining the optimum configuration of the reference camera 302 and/or the reference inspection apparatus. This can be produced, for example, by government authorities or authorized (accredited) companies. The primary standard 300 can be designed in such a manner that not only the parameters being tested and/or calibrated by means of the method described here, but also additional parameters or properties of the camera 100, can be checked and/or adjusted with the same. These can also be, in particular, parameters which influence an adequately sharp image in a prespecified depth of field.

FIG. 8 shows a primary standard 300 which is suitable for testing and/or adjusting inspection apparatuses for detecting optical codes. For this purpose, the primary standard 300 has representations of optical codes (optical representations of matrix codes in the exemplary embodiment shown), which differ with regard to the quality of the representation. As already explained above, certain standards exist in this context—for example, in the form of the ISO/IEC 15416 standard for bar codes and the ISO/IEC 15415 standard for matrix codes. In these standards, the properties of certain quality levels or grading levels (A, B, C, D, F) are defined by means of various parameters (for example, symbol contrast, minimal edge contrast, modulation, etc.).

In the embodiment of a primary standard 300 shown in FIG. 8, five different representations of matrix codes with different quality levels are provided as test information. The quality levels A to D (out of possible levels A to F) are indicated in parentheses below the respective representation of a code. The additional representation of the values of the individual parameters, from which the quality level of the given code representation was determined, has been omitted in the schematic representation of a primary standard 300 according to FIG. 4. However, these can also be specified in order to not only be able to verify, during the verification of a camera with the primary standard 300, whether the quality levels of the individual code representations are correctly determined during evaluation of the image supplied by the camera, but also, in the event of deviations in the determined quality level, to be able to determine which of the individual parameter values which were determined from the camera image do not correspond precisely enough to the value indicated on the primary standard 300 for the specific code representation.

This primary standard 300 is used to determine the optimal configuration of a reference camera 302 and/or of a corresponding reference inspection apparatus. For this purpose, using a defined illumination and a prespecified configuration for the aperture (aperture value), an image of the test information provided on the primary standard is captured by means of the reference camera 302. The distance between the primary standard and the reference camera 302 is chosen with respect to the selected aperture value in such a manner that a sharp image of the surface and/or of the inspection information of the primary standard is ensured. The distance between the surface of the primary standard and the reference camera 302 corresponds to the distance fixed by the holder 102 between the camera 100 (and/or the reference camera 302) and the test standard 108 when the test standard 108 is imaged. The exposure time of the reference camera 302 is selected according to the selected illumination and other configuration values, in particular for the diaphragm, in such a way that the best possible image results. The optimal configuration of the reference camera 302 determined in this manner is then also used to capture an image of the test standard 108 by means of the reference camera 302 and to determine the corresponding reference gray values of the test standard 108.

In the simplified test and/or adjustment method according to the invention, in which a test standard 108 having the features described above is used, it can be assumed that a camera tested and/or calibrated with this method and found to be correct (and accordingly also an inspection apparatus which comprises the camera) is also capable of correctly recognizing the optical structures which must be detected in a working mode of the camera. The simplified test and/or adjustment method according to the invention only ensures a test of the imaging properties of the camera with regard to the gray values of an image supplied by the camera, with respect to the corresponding characteristics of a reference camera. However, it can be assumed that in practice the remaining display characteristics and/or parameters of the camera can be easily checked in another way, or hardly vary over the life of the camera, such that verification is not required and the correctness of the configuration of these parameters can be assumed. Finally, it should again be noted that the inventive method is not limited to cameras and/or inspection apparatuses for the detection of optical codes, but can also be applied in the same way for other optical detection tasks and/or devices. For example, with the invention, a camera and/or inspection apparatus can be tested and/or calibrated for detecting optical structures as part of verifying the optical properties of components, or a camera and/or inspection apparatus can be tested and/or calibrated to verify the completeness of the assembly of printed circuit boards. For cameras in other applications as well, such as cameras for automotive applications (cameras for lane assistants and cameras for autonomous driving, etc.), the invention can be used, for example, in the context of regular verifications.

LIST OF REFERENCE NUMBERS 100 camera
102 holder
104 first frame part
105 connecting strut
106 second frame part
108 test standard
110 extension
112 housing
200 optical inspection apparatus
202 evaluation and control unit
202a memory
202b switch
204 communication connection
206 illumination unit
208 object
210 communication connection
212 higher-level data processing unit
214 communication connection
300 primary standard
302 reference camera

The invention claimed is:

1. A method for testing and/or calibrating a camera, in particular a digital camera, the method comprising:
   (a) creation of an optical test standard, by
      (i) producing a substrate for the optical test standard in such a manner that a plurality of subareas, each with different grayscale representations, is provided on a surface of the substrate or at least partially embedded in the substrate, or by using the substrate for the further steps;
      (ii) capturing at least one reference image of the surface of the substrate, or a reference image when the substrate is irradiated at least in the region of the subareas, by means of a reference camera, wherein the at least one reference image is captured with a prespecified configuration of the reference camera comprising at least one parameter;
      (iii) determining reference gray values for the subareas from the reference image and assigning the reference gray values to the substrate, the reference gray values comprising pixel levels of a digital sensor of the reference camera; and
      (iv) associating the reference gray values with the substrate by applying the reference gray values to the substrate in an optically readable form and/or storing the reference gray values in a memory provided in or on the substrate;
   (b) capturing at least one image of the optical test standard with the camera being tested and/or calibrated, wherein the at least one image is captured with a prespecified configuration comprising at least one parameter of the camera being tested and/or calibrated, and determining actual gray values for the subareas from the at least one image; and
   (c) making a conclusion about an adequate or inadequate adjustment of the camera being tested and/or calibrated according to a comparison of the actual gray values with the reference gray values or with a prespecified value range for permissible actual gray values, the prespecified value range for the permissible actual gray values determined from: the reference gray values; and maximum permissible deviations from the reference gray values.

2. The method according to claim 1, wherein the at least one parameter of the configuration of the camera being tested and/or calibrated is varied in such a manner that, when at least one further image of the optical test standard is captured, a deviation between the actual gray values for the subareas, determined from the at least one further image, and the reference gray values reach a minimum value.

3. The method according to claim 1, wherein the camera being tested and/or calibrated is recognized as being adequately adjusted if a deviation of the actual gray values from the reference gray values lies within a prespecified permissible range, and/or the camera being tested and/or calibrated is recognized as being incorrectly adjusted if the deviation of the actual gray values from the reference gray values is outside the permissible range.

4. The method according to claim 1, wherein the at least one parameter of the configuration of the camera being tested and/or calibrated is varied in such a manner that, when at least one further image of the optical test standard is captured, the actual gray values determined for the subareas from the at least one further image are each within a prespecified range of values for permissible actual gray values, or a deviation of the actual gray values from the reference gray values is within a prespecified permissible range, wherein the camera being tested and/or calibrated is recognized in this case as adequately adjusted.

5. The method according to claim 2, wherein the camera being tested and/or calibrated is assigned an adjustment configuration which comprises the at least one parameter and which comprises the value of the at least one varied parameter, wherein for this adjustment configuration, the camera being tested and/or calibrated has been recognized as adequately adjusted.

6. The method according to claim 1, wherein a conclusion can be made, from a comparison of the actual gray values and the reference gray values, as to whether the camera being tested and/or being calibrated delivers correctable images with adequate quality with the configuration with which the actual gray values were determined, and if so, that a correction operator for correcting the gray values of images which the camera detects in a working mode, can be determined from the actual gray values and the reference gray values.

7. The method according to claim 6, wherein the correction operator is determined by interpolation using the actual gray values and the reference gray values, wherein in particular each possible grayscale level for the reference gray values is assigned a correction value of the correction operator.

8. The method according to claim 1, wherein the reference camera is part of a reference inspection apparatus for checking optical structures, and the camera being tested and/or calibrated is part of an inspection apparatus being tested and/or calibrated for checking optical structures.

9. The method according to claim 1, wherein an adjustment of the reference camera is performed using an optical primary standard on which a plurality of optical structures is provided, each having an associated imaging quality level, wherein the optical structures are optical codes, and wherein the configuration of the reference camera is determined in such a manner that, from an image of the optical primary standard captured with this configuration, the optical structures are assigned a correct quality level.

10. The method according to claim 1, wherein the steps (b) and (c) of claim 1 for testing and/or calibrating the camera being tested and/or calibrated are carried out by the manufacturer or by the user.

11. The method according to claim 6, wherein the correction operator comprises a dot operator.

12. The method according to claim 9, wherein the optical codes comprise bar codes or matrix codes.

\* \* \* \* \*